United States Patent
Parkos et al.

(10) Patent No.: US 8,449,784 B2
(45) Date of Patent: May 28, 2013

(54) METHOD FOR SECURING A SHEATH TO A BLADE

(75) Inventors: Joseph Parkos, East Haddam, CT (US); James O. Hansen, Glastonbury, CT (US); Christopher J. Hertel, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 42 days.

(21) Appl. No.: 12/974,427

(22) Filed: Dec. 21, 2010

(65) Prior Publication Data

US 2012/0152893 A1  Jun. 21, 2012

(51) Int. Cl.
- *B44C 1/22* (2006.01)
- *C23F 1/00* (2006.01)
- *F01D 5/00* (2006.01)
- *C23F 1/44* (2006.01)

(52) U.S. Cl.
CPC .. *F01D 5/005* (2013.01); *C23F 1/44* (2013.01)
USPC ................. 216/34; 216/83; 216/96; 216/100; 216/102

(58) Field of Classification Search
CPC ..................................... F01D 5/005; C23F 1/44
USPC ................. 216/34, 83, 96, 100, 102
See application file for complete search history.

(56) References Cited

U.S. PATENT DOCUMENTS

| | | | |
|---|---|---|---|
| 3,799,701 A | | 3/1974 | Rothman |
| 3,886,647 A | | 6/1975 | Alexander |
| 4,010,530 A | | 3/1977 | Delgrosso et al. |
| 4,051,289 A | | 9/1977 | Adamson |
| 4,111,606 A | | 9/1978 | Prewo |
| 4,585,519 A | | 4/1986 | Jaffe et al. |
| 4,793,903 A | | 12/1988 | Holmquist et al. |
| 5,486,283 A | * | 1/1996 | Mnich ............................ 205/174 |
| 6,004,101 A | | 12/1999 | Schilling et al. |
| 6,355,121 B1 | * | 3/2002 | Opalka et al. ................. 148/703 |
| 6,407,047 B1 | * | 6/2002 | Mehta et al. .................. 510/254 |
| 6,607,358 B2 | * | 8/2003 | Finn et al. ..................... 416/224 |
| 7,094,033 B2 | | 8/2006 | Pauley et al. |
| 2004/0214023 A1 | * | 10/2004 | Park et al. ..................... 428/458 |
| 2008/0102292 A1 | | 5/2008 | Vontell et al. |
| 2009/0032295 A1 | * | 2/2009 | Okajima et al. .............. 174/260 |
| 2010/0310893 A1 | * | 12/2010 | Derbyshire et al. .......... 428/528 |
| 2011/0211967 A1 | * | 9/2011 | Deal et al. .................... 416/224 |

* cited by examiner

*Primary Examiner* — Shamim Ahmed
(74) *Attorney, Agent, or Firm* — Kinney & Lange, P.A.

(57) ABSTRACT

A method for bonding a sheath made of a first metallic material to an airfoil made of a second metallic material includes treating the bonding surface of the airfoil; treating the bonding surface of the sheath; placing an adhesive between the bonding surfaces of the airfoil and the sheath; and pressing the airfoil and sheath together so that the adhesive bonds the sheath to the airfoil.

15 Claims, 5 Drawing Sheets

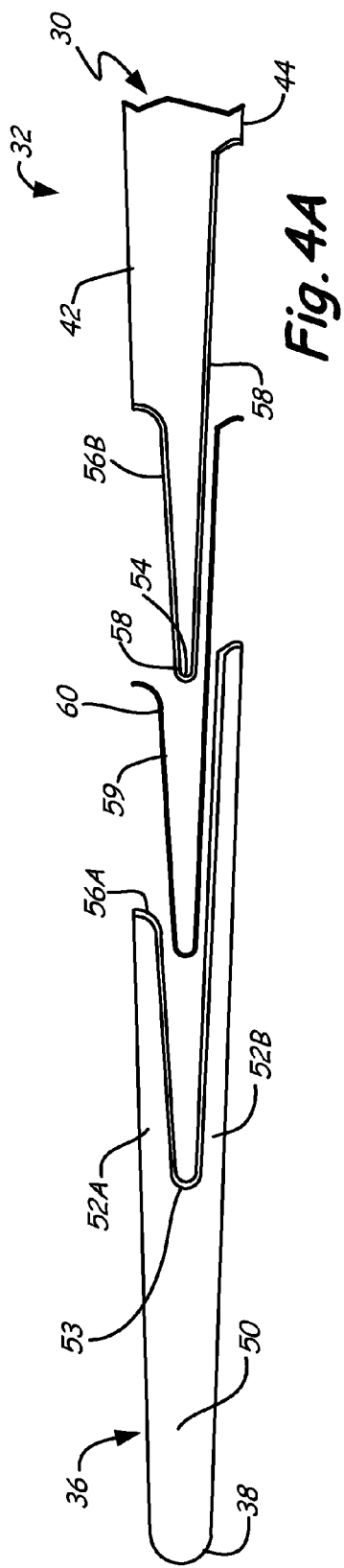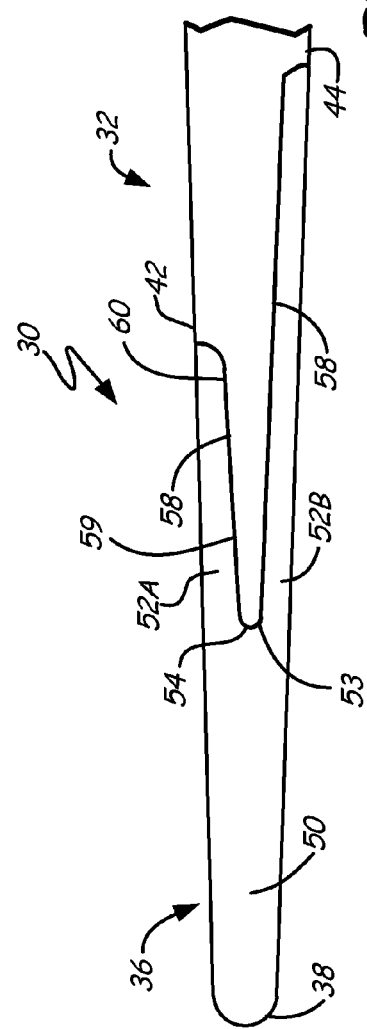

METHOD FOR SECURING A SHEATH TO A BLADE

CROSS-REFERENCE TO RELATED APPLICATION(S)

This application is related to U.S. application Ser. No. 12/713,867, titled HYBRID METAL FAN BLADE and filed on Feb. 26, 2010, which is herein incorporated by reference.

BACKGROUND

Titanium alloys and fiber composites are the benchmark classes of materials for fan and compressor blades in commercial airline engines. One reason for the materials being so broadly adopted is that regulations require an engine in commercial service to be capable of ingesting birds while allowing for continued operation or safe and orderly shutdown of that engine. Another reason is that the blades must resist cracking from nicks and dents caused by small debris such as sand and rain. Engines with titanium fan blades as well as certain reinforced fiber composite fan blades with adhesively bonded metallic leading edge sheaths are the only ones that currently meet these criteria.

While titanium blades are relatively strong and light in weight, composite blades offer sufficient strength and a significant weight savings over titanium. However, composite blades are expensive to process. Further, due to their relatively low strain tolerance, composite blades require a greater thickness than otherwise equivalent metal blades to meet bird strike requirements. Greater blade thickness reduces fan efficiency and offsets a significant portion of weight savings from using composite materials.

SUMMARY

A method for bonding a sheath made of a first metallic material to an airfoil made of a second metallic material includes treating the bonding surface of the airfoil; treating the bonding surface of the sheath; placing an adhesive between the bonding surfaces of the airfoil and the sheath; and pressing the airfoil and sheath together so that the adhesive bonds the sheath to the airfoil.

BRIEF DESCRIPTION OF THE DRAWINGS

FIG. 4A is a cross-section of the blade and sheath shown in FIG. 3 in the process of being bonded together. FIG. 4B is cross-section of the blade and sheath shown in FIG. 4A bonded together.

DETAILED DESCRIPTION

Figure 1:
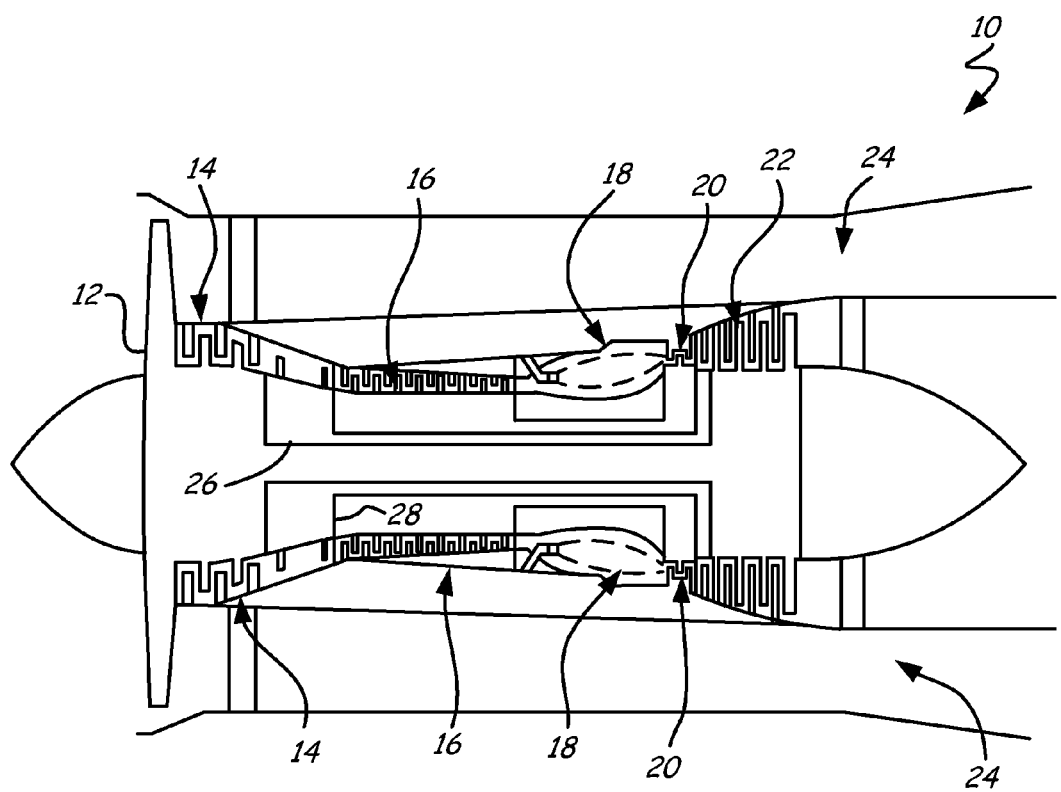
FIG. 1 schematically depicts a cross-section of a turbofan engine.

FIG. 1 shows an example of a dual-spool turbofan engine. Turbofan engine 10 comprises several sections: fan section 12, first low-pressure compressor section 14, second high-pressure compressor section 16, combustor section 18, first high-pressure turbine section 20, second low-pressure turbine section 22, bypass section 24, low-pressure shaft 26, and high-pressure shaft 28. A portion of the atmospheric air pulled in by rotation of fan section 12 is directed toward first compressor section 14, while the remainder is directed toward bypass section 24.

Air directed through first compressor section 14 is further compressed by second compressor section 16. Fuel is added and ignited in combustor section 18. Blades in turbine sections 20 and 22 capture a portion of the energy from passing combustion products by turning turbine rotors. Both fan section 12 and first compressor section 14 are rotatably linked via low-pressure shaft 26 to first low-pressure power turbine section 22. Second high-pressure compressor section 16 is rotatably connected to first high-pressure turbine section 22 via high-pressure shaft 28. Thrust is generated in engine 10 by the force of the air drawn in by fan section 12 and pushed through bypass section 24 (less any bleed air used for other aircraft functions), and by the force of exhaust gases exiting from second low-pressure turbine section 22.

Being designed to pull vast quantities of air through bypass section 24 to generate thrust, blades in fan section 12 are the first line of defense for engine 10 and are highly susceptible to both small and large scale damage from objects pulled in with the surrounding air, including bird impact damage. Small scale blade damage causes performance deterioration and increases the number of potential crack initiation sites, while large scale damage includes blade deformation and failure. Small impacts can also lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Blades made entirely from high-strength materials, such as titanium or titanium alloys like Ti-6Al-4V, have been proven to offer sufficient hardness to resist erosion and foreign object damage. But titanium alloys are often expensive to purchase and manipulate into a finished blade, particularly in a hollow configuration. Additionally, titanium fan blades are usually heavier than other options. Fiber composites offer significant weight savings relative to titanium and its alloys, but are also expensive to fabricate. Hollow titanium blades decrease weight, but are not usually cost-effective in smaller engines with smaller components and therefore a smaller cavity due to the need to have a certain thickness in blade walls to maintain adequate structural support. In small engines, the costs saved by reducing weight through hollow blades are frequently offset by added processing costs to form the smaller cavity. Further, even in larger blades, current hollow metal blades are relatively expensive to manufacture.

Using a lower-cost metallic material for the airfoil body, such as an aluminum alloy, can reduce the weight of a blade and can be produced at low cost. However, blades formed from a lightweight metallic material, such as aluminum, need additional support or reinforcement to offer sufficient strength and durability for long-term use. Without additional fortification against foreign object damage, such unprotected aluminum blades are susceptible to rapid deterioration and shorter lifecycles under normal operating conditions.

Small-scale deterioration typically consists of pitting, nicks, dings, and erosion from sand, rain, and small runway debris. As atmospheric air is drawn into engine 10 by fan section 12, air is forced chordwise over a leading edge of the blades. The air frequently brings debris that bombard the blades and compromise their aerodynamic shape, causing blades to depart significantly from their intended design. When blades lose their shape, efficiency decreases and fuel consumption increases.

This deterioration occurs relatively quickly in unprotected aluminum blades regardless of their overall strength. Additionally, unprotected aluminum blades are more susceptible to unplanned failures from larger foreign object strikes, potentially requiring immediate expensive repairs, replacement, downtime for the engine, or catastrophic failure. In an example case of aluminum alloy fan blades having no additional protection, pitting and erosion can occur, thus necessitating shorter maintenance and replacement time horizons for unprotected lightweight blades.

Reinforcing and protecting leading portions of a lightweight blade with a sheath of a stronger metallic material can reduce the weight of the blade while meeting or exceeding current design and safety requirements. Because the blade needs the sheath to resist deterioration, it is critical to ensure that the sheath is securely bonded to the blade. Due to the extreme environment of engine 10 and a possible lifespan of 20-30 years for a blade, the method of attaching the sheath must be reliable and strong.

The following figures show a fan blade made of an aluminum alloy and a titanium sheath, and describe the process of securely bonding the sheath to the blade to ensure it reliably connects to and protects the blade. The blade can be adapted for use in example dual-spool engine 10 shown in FIG. 1. In addition, the example blades described below can also be readily adapted for engines having any number of spools, such as engines with single spool or three-spool construction.

Figure 2:
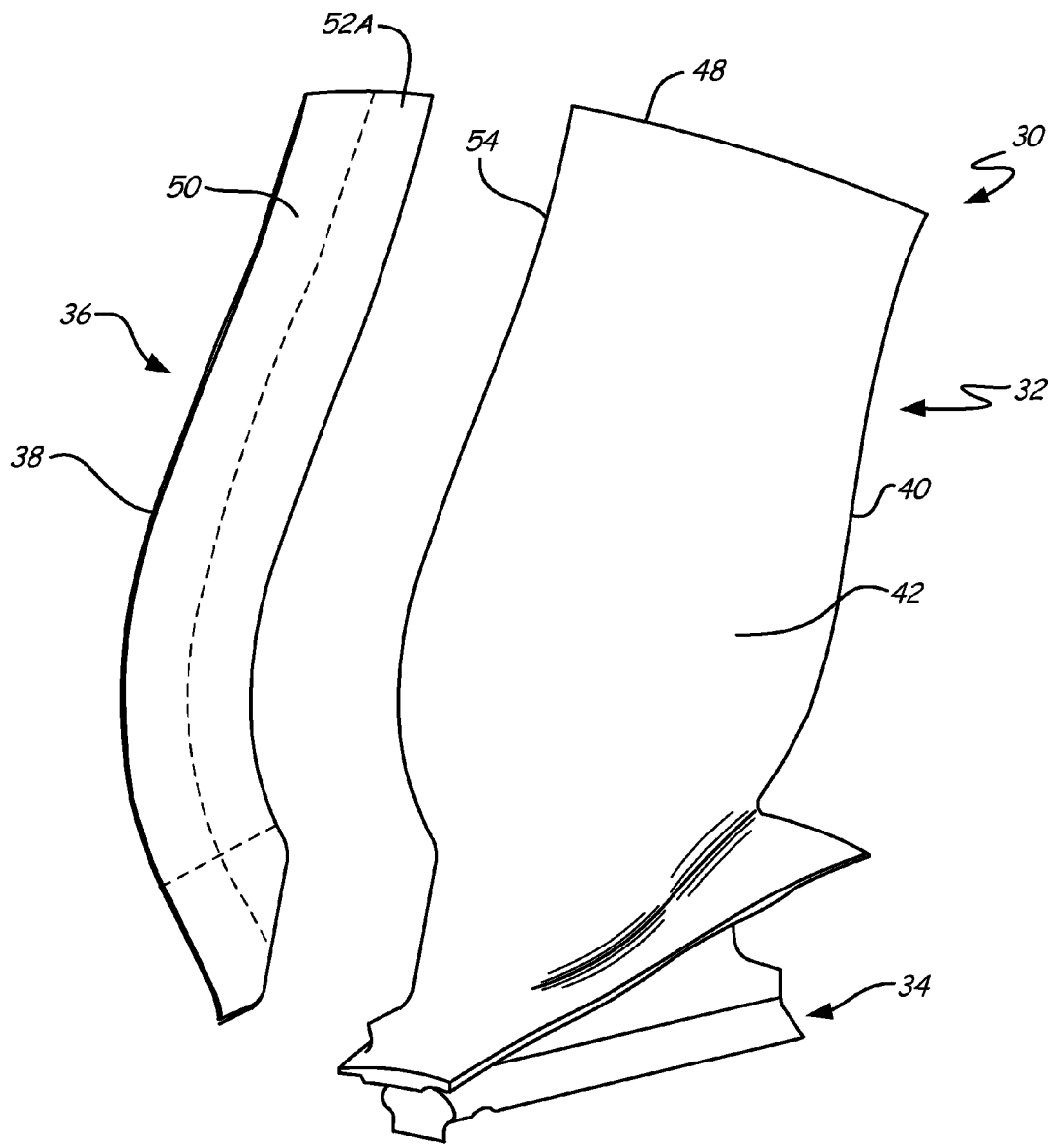
FIG. 2 shows a side view of a blade and a sheath not yet bonded together.

FIG. 2 shows a view of a blade and sheath not yet bonded together. Blade 30 includes airfoil 32, root 34, trailing edge 40, suction surface 42, tip 48, and airfoil edge 54. Sheath 36 includes leading edge 38, sheath head section 50 and sheath flank 52A. Pressure surface 44 and sheath flank 52B are not visible in this depiction (shown in FIGS. 4A-4B). Flanks 52A, 52B connect to and extend from sheath 36 head section 50. Root 34 fits into a disc (not shown) to rotate blade 30 within fan section 12. Sheath 36 can be a titanium alloy or other material with sufficient strength to protect blade 30 in engine 10 when engine 10 is in operation. Blade 30 with airfoil 32 and root 34 can be an aluminum alloy or a similar lightweight material to provide a lightweight blade without a complicated and expensive manufacturing process.

Leading edge 38 of sheath 36 can be fabricated in a variety of ways, including, but not limited to stamping, electroforming or electrical discharge machining ("EDM"). Fabricating by EDM often leaves a recast layer on titanium surface. This recast layer is a result of the alloy melting during cutting and then resolidifying at the surface. The recast layer must be removed prior to bonding to ensure a secure bond between sheath 36 and airfoil 32.

Figure 3:
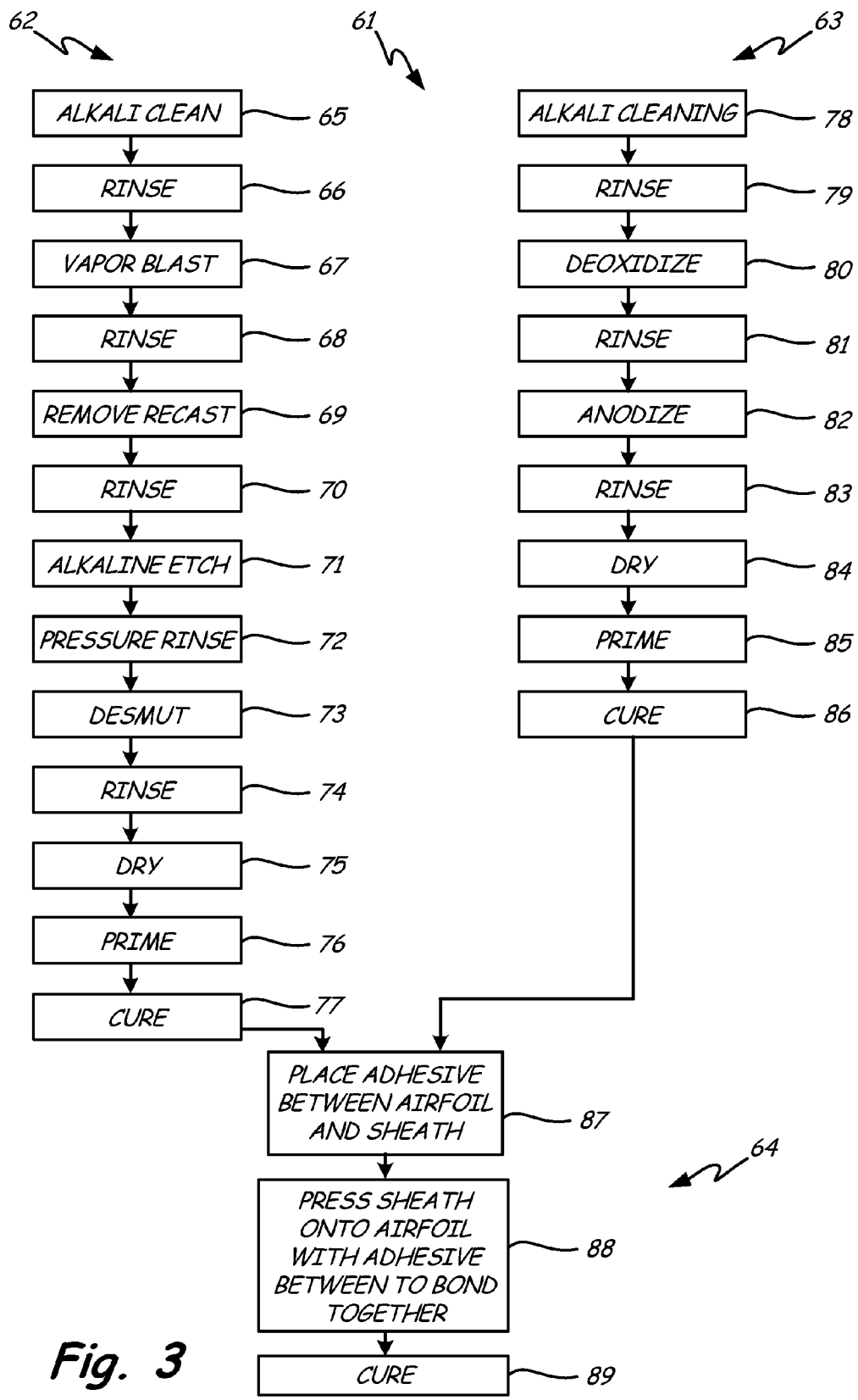
FIG. 3 shows a block diagram of a method of bonding a sheath to a blade according to the current invention.

FIG. 3 is a block diagram of a method for bonding sheath 36 to airfoil 32 according to the current invention. Method 61 includes process 62 for treating bonding surface of sheath 36, process 63 for treating bonding surface of airfoil 32, and process 64 for bonding sheath 36 to airfoil 32 of blade 30.

Process 62 for treating bonding surface of sheath 36 can include the following steps: alkali clean 65, rinse 66, vapor blast 67, rinse, 68, remove recast 69, rinse 70, alkaline etch 71, pressure rinse 72, desmut 73, rinse 74, dry 75, prime 76 and cure 77. Alkali cleaning (step 65) can be done by soaking sheath 36 in a light duty alkali for a water break free surface. Any cleaner approved for use on the specific titanium (or other metallic) alloy which sheath 36 is made of can be used. Rinsing (step 66) removes the alkali cleaner from sheath 36. Vapor blasting (step 67) is done to the internal surface 53 of sheath 36. Vapor blasting (step 67) cleans the interior surface 53 of sheath 36 with a fine abrasive suspended in water propelled at high speed by air or steam at interior surface 53. Rinsing (step 68) removes any particles left or loosened from vapor blasting (step 67).

As mentioned above, when sheath 36 is made by electrical discharge machining, the EDM process can result in a recast layer. Removing recast (step 69) can be done by placing sheath 36 in a solution of about 40% nitric acid and about 2% hydrofluoric acid for whatever amount of time is necessary to remove the recast layer. Rinsing (step 70) cleans anything left on sheath 36 after removing recast (step 69).

Alkaline etch (step 71) is generally done with a strong alkaline etchant. For example a Turco etching solution, such as Turco 5578-L, could be used at about 190 degrees F. (plus or minus about 10 degrees F.) for about 5 minutes. The etching process prepares inside surfaces 53 of sheath head section 50 and sheath flanks 52A, 52B for bonding to forward airfoil edge 54 of blade 32 by removing oils and loose oxides on the surface without damaging or changing the shape of sheath 36. Etching (step 71) can often result in a black residue, commonly called smut, on the surface of the sheath 36. This smut is a loose layer that interferes with bonding, and therefore must be removed prior to bonding sheath 36 with blade 32. A variety of processes can be used to desmut sheath 36 (step 73), including treating sheath 36 with a solution of about 5% nitric acid at room temperature for about 30 to about 60 seconds. Next, sheath 36 is rinsed (step 74) and dried (step 75) to prepare for priming (step 76). A thin layer of resin primer is applied to inside surface 53 of sheath 36 and cured (step 77) to stabilize and preserve the surface for adhesive bonding to the blade. The primer is generally an epoxy and may contain a corrosion inhibiting material such as a chromate-containing compound.

Process 63 for treating bonding surface of aluminum airfoil 32 generally is referred to as phosphoric acid anodizing, and can include the following steps: alkali clean 78, rinse 79, deoxidize 80, rinse 81, anodize 82, rinse 83, dry 84, prime 85 and cure 86.

Alkali cleaning (step 78) can be done using a light duty alkali to result in a water break free surface. Any cleaner appropriate for use on aluminum or aluminum alloy can be used. Deoxidizing (step 80) can be done in a variety of ways. For example, deoxidizing can be done by anodically treating airfoil 32 for about 15 minutes at about 7.5 volts in about 85 degrees F. (plus or minus about 5 degrees F.) in a solution of about 15% Phosphoric acid. Deoxidizing (step 80) works by forming oxide on the surface of blade 30. The oxide then dissolved as it forms, lifting contaminants off the surface when it dissolves. Anodizing (step 81) can be done by making airfoil 32 anodic for about 20 to about 25 minutes at about 15 volts in a solution of about 7.5% phosphoric acid at about 77 degrees F. (plus or minus about 5 degrees F.). Anodizing (step 81) generates an oxide layer on bonding surface with a particular morphology that promotes adhesive bond strength. Airfoil 32 then is rinsed (step 83) and dried (step 84) to remove any acid solution. Drying (step 84) can be done at a maximum of about 160 degrees F. Airfoil 32 is then primed (step 85) with a thin layer of epoxy with a corrosion inhibiting material, such as a chromate-containing compound, which is then cured (step 86).

Process 64 for bonding sheath 36 to airfoil 32 includes: placing adhesive between blade and sheath 87, placing sheath on blade with adhesive between 88 and curing the assembly under suitable heat and pressure 89. The adhesive must have sufficient strength to securely hold sheath 36 to airfoil 32 in extreme aerospace conditions, including during impact events. Suitable adhesives include a wide variety of high-strength epoxy-based adhesives including Henkel EA 9628 and 3M type AF163K epoxy adhesives. Adhesive can be in film form and can include a scrim sheet (discussed in depth in regards to FIG. 4A). Suitable heat and pressure used in step 89 can vary depending on type of adhesive and materials used, but can be, for example, 250 degrees F. and 30 psi.

Surface treating sheath 36 and airfoil 32 on their respective bonding surfaces before bonding together with adhesive ensures a reliable bond of sufficient strength for airfoil 32 to retain sheath 36 as protection throughout the years blade 30 is in service in engine 10. Surface treating of sheath in process steps 62 creates a microroughness on the bonding surface which enhances adhesive bond strength. Surface treating of airfoil in process steps 63 creates a surface which enhances adhesive bond strength to airfoil 32. Method of bonding 61 ensures the bond between airfoil 32 and sheath 36 is sufficiently strong to withstand normal operating conditions as well as many impact events, such as a birdstrike. In the event of a bird strike proximate leading edge 38, flank 52B on pressure surface 44 provides surface and bonding area for sheath 36. The motion of blade 30 tends to force the bird to strike closer to pressure side 44, bending blade 30 opposite its regular curvature. Sheath head portion 50 is pushed toward suction surface 42 bending and shearing flank 52B away from pressure surface 44. Therefore, a secure bond is necessary to resist shearing of sheath 36 away from airfoil 32, increasing the likelihood that blade 30 can withstand a bird strike.

Method 61 of bonding sheath 36 to blade 32 makes the use of the desireable light-weight aluminum alloy blade with a titanium protective sheath possible. Method 61 allows for the use of the aluminum alloy blades with a titanium sheath instead of the more expensive and heavier titanium blades or the difficult to manufacture composite blades by ensuring protective sheath 36 will stay bonded to the lightweight blade 32, and therefore maintain similar levels of strength and durability of past (titanium or composite) blades.

While method 61 shown includes process steps 62 for surface treating sheath 36 which has been fabricated through EDM, process steps 62 could be adapted to surface treat a sheath fabricated in another manner. For example, if a sheath was fabricated by stamping, steps for removing recast (steps 69 and 70) could be deleted.

FIG. 4A shows a cross section of a blade 30 as it is being prepared to be bonded to sheath 36. Blade 30 in FIG. 4A includes airfoil 32, suction surface 42, pressure surface 44, tip edge 48, forward airfoil edge 54, primer 56B and sheath receiving surface 58. Sheath 36 includes sheath head section 50, flanks 52A, 52B, inner surface 53, leading edge 38, and primer 56A. FIG. 4A also includes adhesive 59 and scrim sheet 60.

Sheath receiving surface 58 is located on airfoil 32 proximate leading edge 38 and includes a portion of suction surface 42 and pressure surface 44. Sheath receiving surface 58 has been surface treated for bonding in the method described in relation to FIG. 3, and a thin layer of primer 56A has been applied to sheath receiving surface 58. Flanks 52A and 52B extend back from head section 50 of sheath 36. Sheath 36 inner surface 53 has been surface treated according the method described in relation to FIG. 3, and primer 56A has been applied to inner surface 53 of head section 50 and flanks 52A, 52B. Scrim sheet 60 is embedded in adhesive 59. Adhesive 59 and scrim sheet 60 go between sheath 36 and airfoil 32. Adhesive 59 bonds sheath 36 to airfoil 32. Scrim sheet 60 ensures a minimal amount of separation between sheath 36 and airfoil 32 when bonded.

Adhesive 59 can be one of a variety of commercially available aerospace-quality metal-bonding adhesives, including several epoxy- and polyurethane-based adhesive films. In some embodiments, the adhesive is heat-cured via autoclave or other similar means. Examples of suitable bonding agents include type EA9628 epoxy adhesive available from Henkel Corporation, Hysol Division, Bay Point, Calif. and type AF163K epoxy adhesive available from 3M Adhesives, Coatings & Sealers Division, St. Paul, Minn. In certain embodiments, such as is shown in FIG. 4A, adhesive 59 is a film, which also contributes a minute amount of thickness of blade 30. In one example, a layer of adhesive film 59 is about 0.005-0.010 inch (1.2-2.5 mm) thick. Despite the additional thickness, a film-based adhesive 59 allows for generally uniform application, leading to a predictable thickness to be accounted for in sizing flanks 52A and 52B, as well as the thickness of airfoil 32 proximate forward airfoil edge 54.

Scrim sheet 60 can be embedded into adhesive 59 and provides dielectric separation between airfoil 32 and sheath 36, preventing galvanic corrosion between the two different metal surfaces of airfoil 32 and sheath 36. The material forming scrim sheet 60 is often determined by its compatibility with adhesive 59, and can be, for example, a flexible nylon-based layer with a thickness between about 0.002 inch (0.051 mm) and about 0.005 inch (0.127 mm) thick.

Bonding of sheath 36 to airfoil 32 with adhesive 59, and separating the dissimilar metals with scrim sheet 60 improves several aspects of blade 30. When sheath 36 is produced separately and the contact surfaces of airfoil 32 and sheath 36 are properly prepared for bonding with treatments describe in relation to FIG. 3, complex high temperature bonding and forming processes are not necessary. Thus, no deformation is caused around leading edge 38, allowing airfoil 32 to retain its shape and integrity during bonding to sheath 36. Furthermore, as mentioned above, scrim sheet 60 prevents galvanic corrosion by ensuring at least a minimal separation between sheath 36 and airfoil 32.

FIG. 4B shows a partial cross-section of blade 30 after sheath has been bonded to airfoil. Blade 30 includes airfoil 32, sheath 36, leading edge 38, suction surface 42, pressure surface 44, sheath head section 50, sheath flanks 52A and 52B, airfoil forward edge 54, and sheath receiving surface 58.

Adhesive 59 bonds inner surface 53 of sheath 36 to airfoil 32 forward edge 54, with scrim sheet 60 ensuring a minimal separation. When sheath 36 is bonded to airfoil 32, flanks 52A and 52B extend substantially chordwise rearwardly from sheath head section 50 toward trailing edge 40. Flanks 52A and 52B cover portions of suction surface 42 and pressure surface 44 proximate leading edge 38. Flanks 52A, 52B increase bonding surface between sheath 36 and airfoil 32, increasing bond strength. Flanks 52A and 52B also protect blade 30 from indirect impacts proximate leading edge 38. The dimensions of flanks 52A and 52B can vary depending on blade 30 requirements.

Sheath head section 50 of sheath 36 extends forward (i.e., into the oncoming air stream) away from airfoil 32 and forms leading edge 38. Sheath head section 50 provides stiffness and resiliency in the event of a direct or near-direct strike from a foreign object and minimizes damage to the underlying airfoil 32. In some embodiments, sheath head section 50 replaces a portion of airfoil 32 near its forward edge, while in other embodiments, head section 50 increases the chordwise length of blade 30 by an amount equal to chordwise dimension of head section 50. This ensures aerodynamic continuity between airfoil portion 32 and sheath portion 36.

Additional material on sheath 36 also improves reparability of blade 30. Blade 30 can be repaired, often several times, by machining out dents and other sharp corners. This repair is common in titanium-based blades to increase their serviceable life before being recycled into new blades or into other articles. In most titanium blades or sheaths, there is often a limited amount of excess material because of the inherent motivation to reduce weight and the physical constraints of producing sheaths with large thickness via processes like electroforming. But in blade 30, substituting a lower density metallic material in airfoil 32 provides substantial weight savings without sacrificing overall strength as previously described. This substantial weight savings provides some leeway for the size of sheath 36 to be increased in its chordwise and thickness dimensions while still achieving significant weight savings in blade 30.

Figure 5:
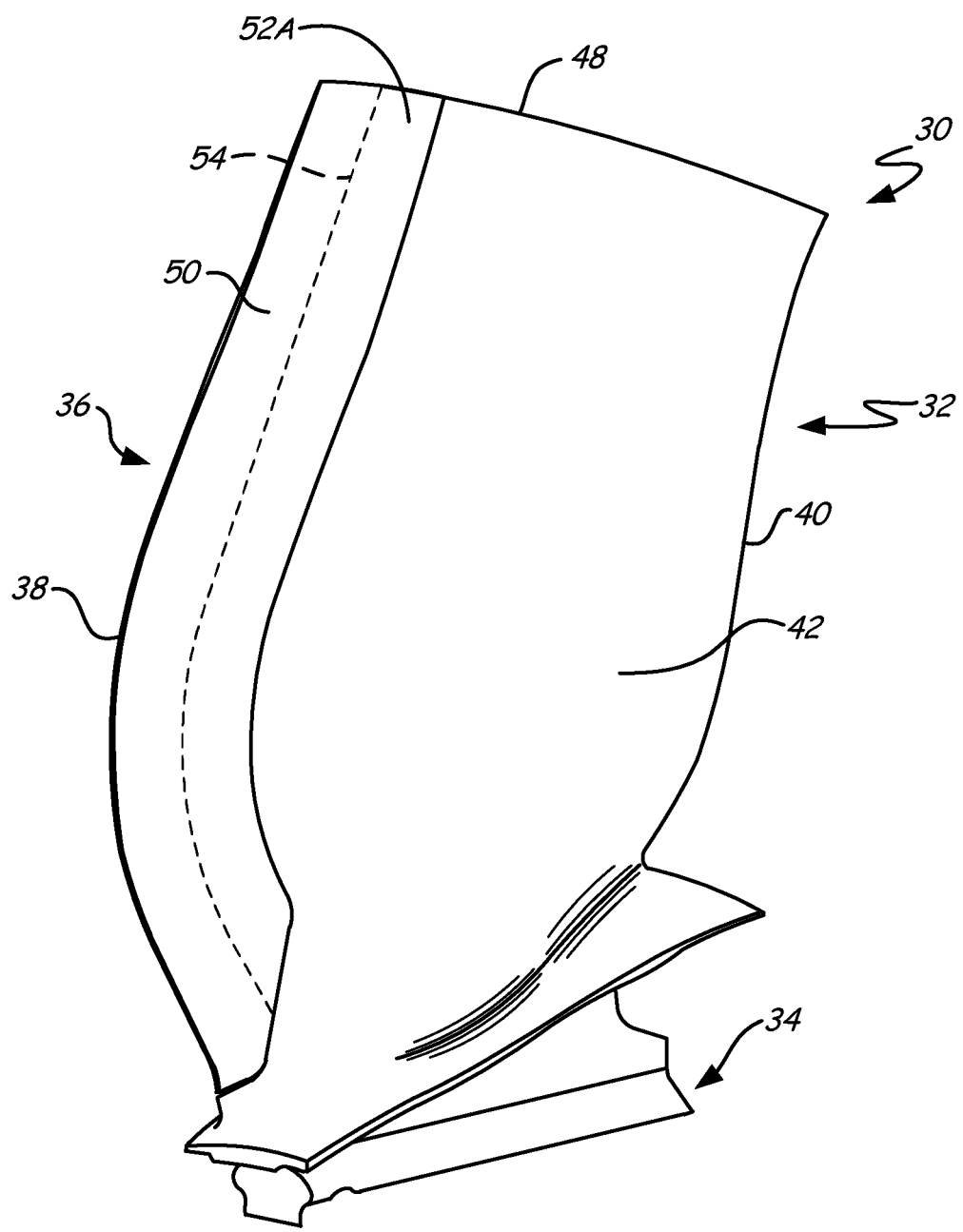
FIG. 5 is a side view of the blade with sheath shown in FIG. 2 bonded together.

FIG. 5 shows a side view of blade 30 with sheath 36 bonded to airfoil 32. FIG. 5 includes blade 30 with airfoil 32 (with trailing edge 40, suction surface 42, tip 48, and airfoil edge 54), sheath 36 (with leading edge 38, sheath head section 50 and sheath flank 52A), and root 34. Inner side 53 of sheath flanks 52A, 52B and head section 50 are bonded to airfoil 32, forming an aerodynamic blade for use in fan section 12 of engine 10 (FIG. 1).

Sheath 36 covers airfoil 32 proximate leading edge 54, protecting airfoil 32 from foreign object damage described above. Sheath 36 gives blade 30 a significant amount of strength, even when airfoil 32 is made of a lightweight and more ductile material like an aluminum alloy. The most protection of blade 30 is seen when sheath 36 extends across substantially the entire length of leading edge 38. In certain embodiments, a small portion of airfoil forward edge 54 forms the remainder of blade leading edge 38. In other embodiments, sheath 36 only extends over a part of the spanwise length of leading edge 38.

In summary, the bonding method of the current invention allows for the use of a lightweight airfoil with a sheath made of a stronger material to form a blade suitable for use in aerospace engines. Substituting a lighter material, such as an aluminum alloy, in airfoil 32 improves both initial raw material costs and engine efficiency by reducing the overall weight of blade 30. The reduced weight also allows for additional volume of protective sheath 36 proximate airfoil forward edge 54, while still saving weight overall in blade 30. Having a larger volume of excess high-strength material on sheath 36 at leading edge 38 allows for more strength and resiliency to resist deterioration and impact damage to blade 30, as well as extending the serviceable life of blade 30. The bonding method of surface treating and priming the sheath, surface treating and priming the airfoil, and then bonding the sheath to the airfoil ensures a reliable and strong bond, making the use of a lightweight aluminum airfoil with titanium sheath possible.

The above examples of the relative sizes of the components of blade 30 is included for illustrative purposes only and can readily be adapted by one skilled in the art for a variety of engine and blade designs. The dimensions of sheath 36 will vary depending on a number of factors, including the size and shape of blade 30. The size and shape of blade 30 depend on the size and operating envelope of engine 10, which is itself often selected by the purchaser or end user of an aircraft utilizing engine 10.

It should be noted that while a solid blade 30 is shown and described in this disclosure, this specification and the appended claims are not so limited. The invention is readily adaptable to hollow blades 30, the use of which in conjunction with sheath 34 as described herein, will only add to the cost and weight savings achieved.

While the surface treatment of aluminum alloy airfoil has been described in reference to phosphoric acid anodizing, other surface treatments which prepare aluminum airfoil for bonding with sheath could be used. Additionally, while the surface treatment of sheath in been described in terms of etching, other treatments could be used to prepare sheath for bonding with airfoil. Alternative treatments could include sol-get processing of either bonding surface and/or anodizing of the airfoil surface.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising
   treating a bonding surface of an airfoil made of an aluminum material;
   treating a bonding surface of a sheath made of a titanium material by etching the bonding surface of the sheath and priming the bonding surface of the sheath;
   placing an adhesive between the bonding surfaces of the airfoil and the sheath; and
   pressing the airfoil and sheath together so that the adhesive bonds the sheath to the airfoil.

2. The method of claim 1, wherein the step of treating the bonding surface of the airfoil comprises:
   phosphoric acid anodizing the bonding surface of the airfoil; and
   priming the bonding surface of the airfoil.

3. The method of claim 2, and further comprising:
   alkali cleaning the bonding surface of the airfoil before phosphoric acid anodizing the bonding surface of the airfoil.

4. The method of claim 1, and further comprising:
   desmutting the bonding surface after the step of etching the bonding surface of the sheath.

5. The method of claim 1, and further comprising:
   cleaning the bonding surface in an alkali cleaning solution and vapor blasting the bonding surface of the sheath before the step of etching the bonding surface of the sheath.

6. The method of claim 1, wherein the etching is done using an alkaline etching solution.

7. The method of claim 1, wherein the step of placing an adhesive between the bonding surfaces of the airfoil and the sheath comprises:
   inserting a scrim sheet into the adhesive.

8. The method of claim 7, wherein the scrim sheet is made of a nylon material.

9. The method of claim 1, wherein the adhesive is a film adhesive.

10. A method for manufacturing a reinforced blade, the method comprising:
    forming an airfoil from an aluminum material, the airfoil having a leading edge, a trailing edge, a suction surface and a pressure surface;
    treating a bonding surface of the airfoil;
    forming a sheath from a titanium material, the sheath having a head section with an outer side and an inner side, a first sheath flank and a second sheath flank, both flanks extending chordwise rearwardly from the forward sheath section;

treating a bonding surface of the sheath by etching the bonding surface of the sheath, desmutting the bonding surface of the sheath, and applying a primer to the bonding surface of the sheath;

placing an adhesive between the respective bonding surfaces of the sheath and the airfoil; and pressing the sheath and the airfoil together so at least a portion of the leading edge is covered by the head section of the sheath, the first sheath flank covers part of the suction side of the airfoil, the second sheath flank covers part of the pressure side of the airfoil and the sheath is secured to the airfoil by the adhesive.

11. The method of claim 10, wherein the bonding surface of the airfoil includes the leading edge, a portion of the suction surface and a portion of the pressure surface of the airfoil.

12. The method of claim 10, wherein the step of treating a bonding surface of the airfoil comprises:

phosphoric acid anodizing the bonding surface of the airfoil; and applying primer on the bonding surface of the airfoil.

13. The method of claim 10, wherein the adhesive is a film adhesive.

14. The method of claim 10, wherein the adhesive further includes a non-electrively conductive scrim sheet to separate the sheath from the airfoil.

15. A method of securing a titanium sheath to an aluminum airfoil, the method comprising:

surface treating the bonding surface of the aluminum airfoil by phosphoric acid anodizing and priming;

surface treating the bonding surface of the titanium sheath by etching, desmutting and priming;

placing an adhesive with a scrim sheet between the bonding surface of the airfoil and the bonding surface of the sheath; and pressing the sheath and the airfoil together so the adhesive securely holds the sheath to the airfoil and the scrim sheet keeps a minimum separation to prevent corrosion.

* * * * *